US010345878B2

United States Patent
Zhou et al.

(10) Patent No.: US 10,345,878 B2
(45) Date of Patent: Jul. 9, 2019

(54) APPARATUS AND METHOD FOR RESTARTING AN ELECTRONIC DEVICE

(71) Applicant: SEMICONDUCTOR COMPONENTS INDUSTRIES, LLC, Phoenix, AZ (US)

(72) Inventors: Jianing Zhou, Beijing (CN); Peng Zhu, Tianjin (CN); William Robert Newberry, Cumberland Foreside, ME (US); Shuyuan Shao, Beijing (CN)

(73) Assignee: Semiconductor Components Industries, LLC, Phoenix, AZ (US)

( * ) Notice: Subject to any disclaimer, the term of this patent is extended or adjusted under 35 U.S.C. 154(b) by 83 days.

(21) Appl. No.: 15/428,669

(22) Filed: Feb. 9, 2017

(65) Prior Publication Data

US 2017/0235351 A1    Aug. 17, 2017

(30) Foreign Application Priority Data

Feb. 15, 2016    (CN) .......................... 2016 1 0130599

(51) Int. Cl.
| | |
|---|---|
| *G06F 1/00* | (2006.01) |
| *G06F 1/26* | (2006.01) |
| *H02J 9/06* | (2006.01) |
| *H02J 7/00* | (2006.01) |
| *G06F 1/08* | (2006.01) |
| *G06F 1/24* | (2006.01) |
| *H02J 7/34* | (2006.01) |

(52) U.S. Cl.
CPC ................ *G06F 1/263* (2013.01); *G06F 1/08* (2013.01); *G06F 1/24* (2013.01); *H02J 7/0063* (2013.01); *H02J 9/061* (2013.01); *H02J 7/345* (2013.01); *H02J 2007/0067* (2013.01)

(58) Field of Classification Search
CPC .... G06F 1/263; G06F 1/24; G06F 1/08; H02J 7/0063; H02J 9/061; H02J 7/345; H02J 2007/0067
See application file for complete search history.

(56) References Cited

U.S. PATENT DOCUMENTS

| | | | | |
|---|---|---|---|---|
| 2012/0169453 | A1* | 7/2012 | Bryla | ...................... E05B 47/00 340/3.1 |
| 2015/0089260 | A1* | 3/2015 | Tsutsui | .................... G06F 1/263 713/322 |

* cited by examiner

*Primary Examiner* — Xuxing Chen
(74) *Attorney, Agent, or Firm* — Brake Hughes Bellermann LLP

(57) ABSTRACT

This document discusses, among other things, apparatus and methods for restarting an electronic device configured to receive power from a main power supply and an auxiliary power supply. The electronic device includes a reset circuit a reset circuit configured to provide a first signal indicative of an electronic device failure, and an isolation circuit configured to isolate the main power supply from the auxiliary power supply in response to the first signal so that power is supplied to the reset circuit by the auxiliary power supply. The reset circuit can be configured to generate a reset signal for restarting the electronic device with the power supplied by the auxiliary power supply.

20 Claims, 5 Drawing Sheets

APPARATUS AND METHOD FOR RESTARTING AN ELECTRONIC DEVICE

CLAIM OF PRIORITY

This application claims the benefit of priority under 35 U.S.C. § 119(a) of Gavin Zhou et al. CN Application No. 201610130599X, filed on Feb. 15, 2016, which is hereby incorporated by reference in its entirety.

TECHNICAL FIELD

This document relates generally to electronic devices and more particularly to apparatus and methods for restarting an electronic device.

BACKGROUND

Reset circuits, for example, watchdog timers, are widely applied in embedded electronic devices, such as mobile phones and tablets. When a processor of an electronic device no longer feeds a watchdog timer due to an error, a counter on the watchdog timer will overflows, triggering an interrupt request for restarting the processor of the electronic device.

In the prior art, a processor and reset circuit are powered by batteries during the restart of an electronic device, or powered by the external power supply when an electronic device is connected to an external power supply with a power supply adapter. In any of the cases, it is impossible to enable a forced restart of the electronic device.

The information disclosed above in the Background is merely intended to facilitate the understanding of the background of the present invention. Therefore, it may contain information beyond what those of ordinary skills in the art might have known about the prior art.

OVERVIEW

The exemplary embodiments provide an apparatus and method for restarting an electronic device and an electronic device including the apparatus, which can, in the event of a failure of an electronic device, isolate a main power supply and supply power to a reset circuit with an auxiliary power supply so that the reset circuit generates a reset signal, thereby enabling a forced start of the electronic device.

According to an exemplary embodiment, an apparatus for restarting an electronic device is provided, the electronic device configured to receive power from a main power supply, and the apparatus including an auxiliary power supply, a reset circuit, and an isolation circuit. In this embodiment, the reset circuit is configured to send a first signal to the isolation circuit in response to a failure of the electronic device, and the isolation circuit is configured to isolate the main power supply of the electronic device from the auxiliary power supply in response to the first signal so that power is supplied to the reset circuit by the auxiliary power supply. Further, the reset circuit is configured to generate a reset signal for restarting the electronic device with the power supplied by the auxiliary power supply.

According to another exemplary embodiment, an electronic device including the foregoing apparatus is provided.

According to another exemplary embodiment, a method for restarting an electronic device is provided, including monitoring the operation of the electronic device, isolating the main power supply from the auxiliary power supply in response to a failure of the electronic device so that power is supplied to a reset circuit by the auxiliary power supply, and generating a reset signal for restarting the electronic device with the power supplied by the auxiliary power supply.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following simply describes certain exemplary embodiments. Various modifications may be made to the embodiments under description without departing from the spirit or scope of the present invention, just as possibly known by those skilled in the art. Thus, the drawings and description are essentially considered as illustrative rather than restrictive.

Figure 1:
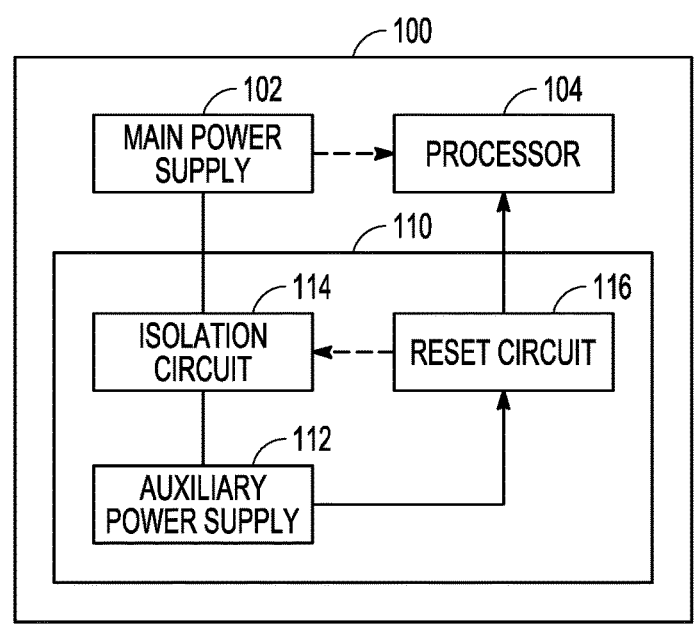
FIG. 1 illustrates an example schematic block diagram of a restart apparatus.

FIG. 1 illustrates an example schematic block diagram of a restart apparatus 110 according to various embodiments of the present subject matter. For ease of understanding, FIG. 1 also shows other parts related to a restart apparatus 110. In an example, a restart apparatus 110 may be installed in an electronic device 100 (e.g., a mobile phone) to monitor the operation of a processor 104 in the electronic device 100. When the processor 104 runs properly, the processor 104 and restart apparatus 110 are powered by a main power supply 102. When the restart apparatus 110 detects a failure of the processor 104, a reset signal is sent to the processor 104.

In particular, as shown in FIG. 1, the apparatus 110 includes an auxiliary power supply 112, an isolation circuit 114, and a reset circuit 116. The reset circuit 116 sends a power-switching control signal to the isolation circuit in response to a failure of the electronic device 100. The isolation circuit 114 isolates the main power supply 102 of the electronic device 100 from the auxiliary power supply 112 in response to the power-switching control signal so that power is supplied to the reset circuit 116 by the auxiliary power supply 112 (e.g., and not the main power supply 102). Then the reset circuit 116 generates a reset signal for restarting the electronic device 100 with the power supplied by the auxiliary power supply 112.

Figure 2:
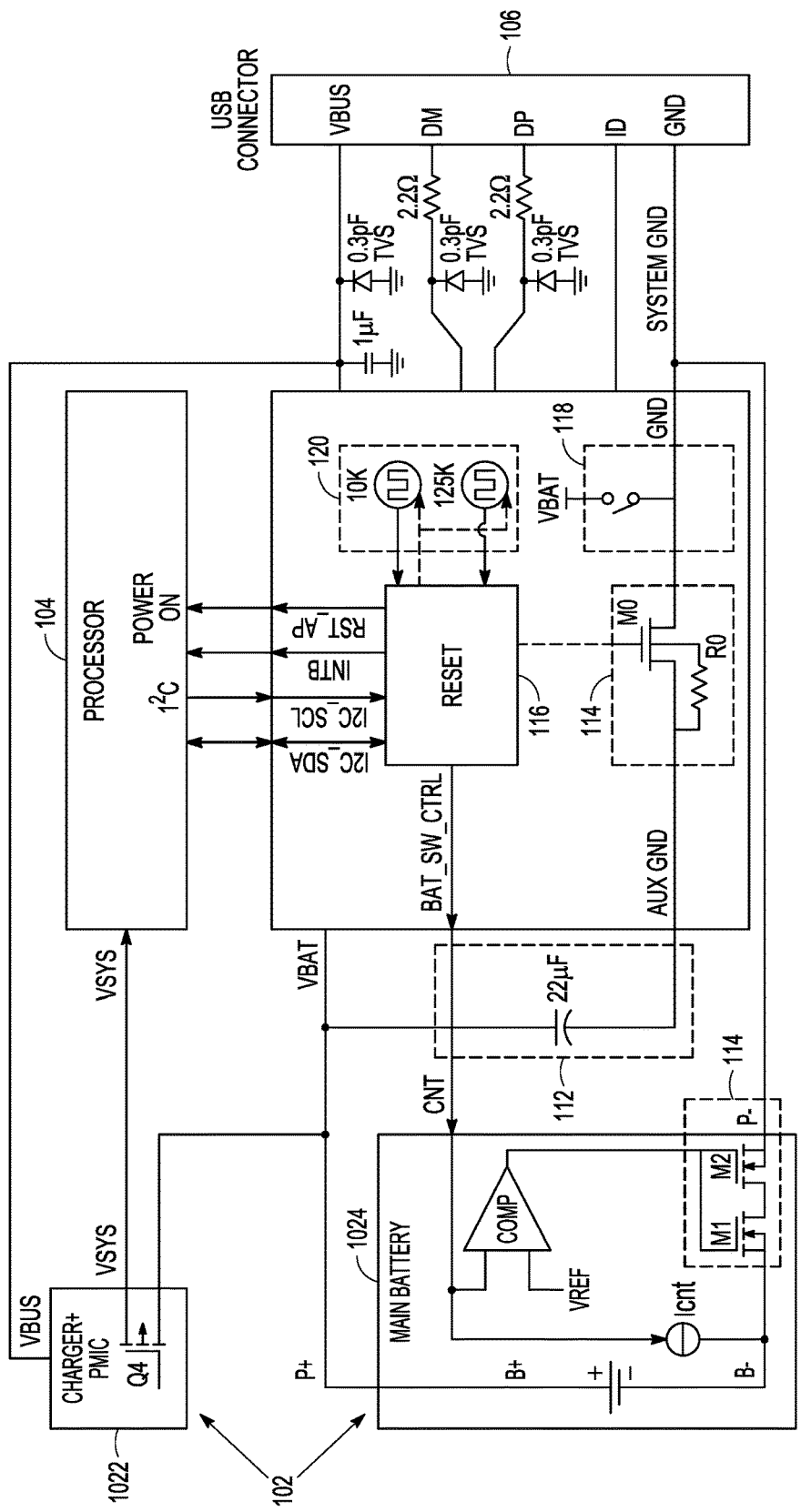
FIG. 2 illustrates an example restart circuit.

FIG. 2 illustrates an example restart circuit according to an embodiment of the present subject matter. FIG. 2 specifically shows a schematic circuit of a restart apparatus 110 and other components in the electronic device 100 that relate to the restart apparatus 110. As shown in FIG. 2, the electronic device 100 includes a main power supply 102, a processor 104, a Universal Serial Bus (USB) connector 106, and the restart apparatus 110.

The main power supply 102 includes a charger and power management integrated circuit (Charger+PMIC) 1022 and a main battery 1024. In proper operation state, a high-voltage end B+ of the main battery 1024 is connected to the power line VBAT, and a low-voltage end B– is connected to the system ground (SYSTEM GND) so that the main battery 1024 is connected to the processor 104 and the restart apparatus 110 to supply power. When the electronic device 100 is connected to an external power supply via a USB connector 106, the Charger+PMIC 1022 may charge the main battery 1024.

The restart apparatus 110 includes an auxiliary power supply 112, an isolation circuit 114, a reset circuit 116, a discharging circuit 118, and a clock switching circuit 120. In this example, the reset circuit 116 is generally implemented by a watchdog timer circuit (which includes an I2C Slave). In this example, the auxiliary power supply 112 is connected between a power line VBAT and an auxiliary ground AUX GND, and may be implemented with, for example, a capacitor (e.g., 22 μF). In FIG. 2, the isolation circuit 114 includes a transistor M0, which is used to isolate the auxiliary ground AUX GND of the auxiliary power supply 112 from the system ground SYSTEM GND. In order to prevent a body diode of the transistor M0 from burning, a current limiting resistor R0 may be connected in parallel between a source and a substrate of the transistor M0, and the current limiting resistor may have a resistance of, for example, 100 ohm. Furthermore, the isolation circuit 114 may further include transistors M1 and M2 that are used to isolate the low-voltage end B– of the main power supply from the system ground SYSTEM GND.

When the electronic device 100 runs properly, the processor 104 communicates with the watchdog timer via an I2C bus (including signal lines INTB, I2C_SCL, and I2C_SDA) and periodically sends a watchdog feed signal to the watchdog timer. Each time the watchdog timer receives the watchdog feed signal, it resets its counter.

When the electronic device 100 fails (for example, a program ran by the processor 104 falls into an infinite loop), the processor 104 no longer sends watchdog feed signals. When the watchdog timer has not been "fed" within a predetermined period of time, its counter will overflow, resulting in a high level output setting of a power-switching control pin (BAT_SW_CTRL) connected to the main power supply 102. As a result of the high level signal (the details will not be repeated herein; please refer to the logic circuit shown in FIG. 2), transistors M1 and M2 in the isolation circuit 114 switch to a cut-off state, thereby isolating the low-voltage end B– of the main battery 1024 from the system ground SYSTEM GND, that is, isolating the main battery 1024 from the entire system. Moreover, as a result of a control signal associated with the high level signal output by the power-switching control pin (BAT_SW_CTRL), the transistor M0 in the isolation circuit 114 switches to a cut-off state, thereby isolating the auxiliary ground AUX GND of the auxiliary power supply 112 from the system ground SYSTEM GND. Thus, power supplied by the main power supply 112 to the processor 104 and reset circuit 116 is cut off, and the reset circuit 116 is only powered by the auxiliary power supply 112 so that the reset circuit 116 may perform a reset operation.

Subsequently, the power-switching control pin (BAT_SW_CTRL) switches from a high-level output state to and remains in a high resistance state, thus restoring the power supplied by the main battery 1024 to the system, and the reset circuit 116 outputs a reset signal RST_AP (which is a low level in this example) to the processor 104, thereby restarting the processor 104.

As shown in FIG. 2, the restart apparatus 110 further includes a discharging circuit 118 used to accelerate the release of remaining charges in the system when power supplied to the system by the main battery 1024 is cut off, thereby accelerating the restarting process.

Furthermore, the restart apparatus 110 may further include a clock switching circuit which is connected to the reset circuit 116 and used to switch a clock provided to the reset circuit 116 to a clock at a lower frequency when the reset circuit 116 is powered by the auxiliary power supply 112, thereby reducing power consumption. When the power supplied to the system by the main battery 1024 is restored, it is switched back to a clock at a higher frequency. For example, in proper operation state, a clock signal at 125 kHz may be applied to the watchdog timer, and when watchdog feed fails, a clock signal at 10 kHz is applied to the watchdog timer instead.

In an example, the watchdog timer may include a watchdog history register, which is used to record a watchdog feed failure for users to view. For example, 1 is added to the value of the register at each watchdog feed failure, and only power-on resetting and a specific watchdog history resetting loop initiated by I2C can reset the register to zero.

Figure 3A:
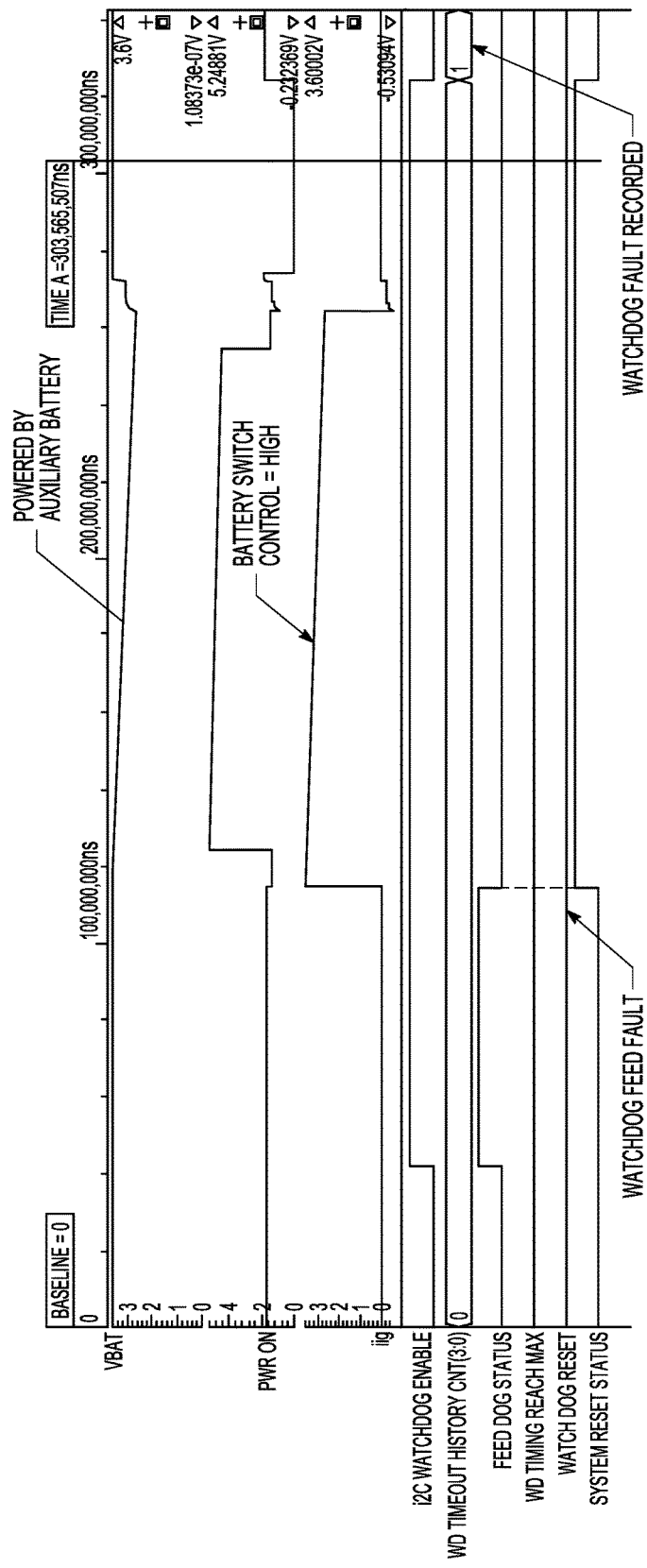
FIGS. 3A-3B illustrate example simulation results.
Figure 3B:
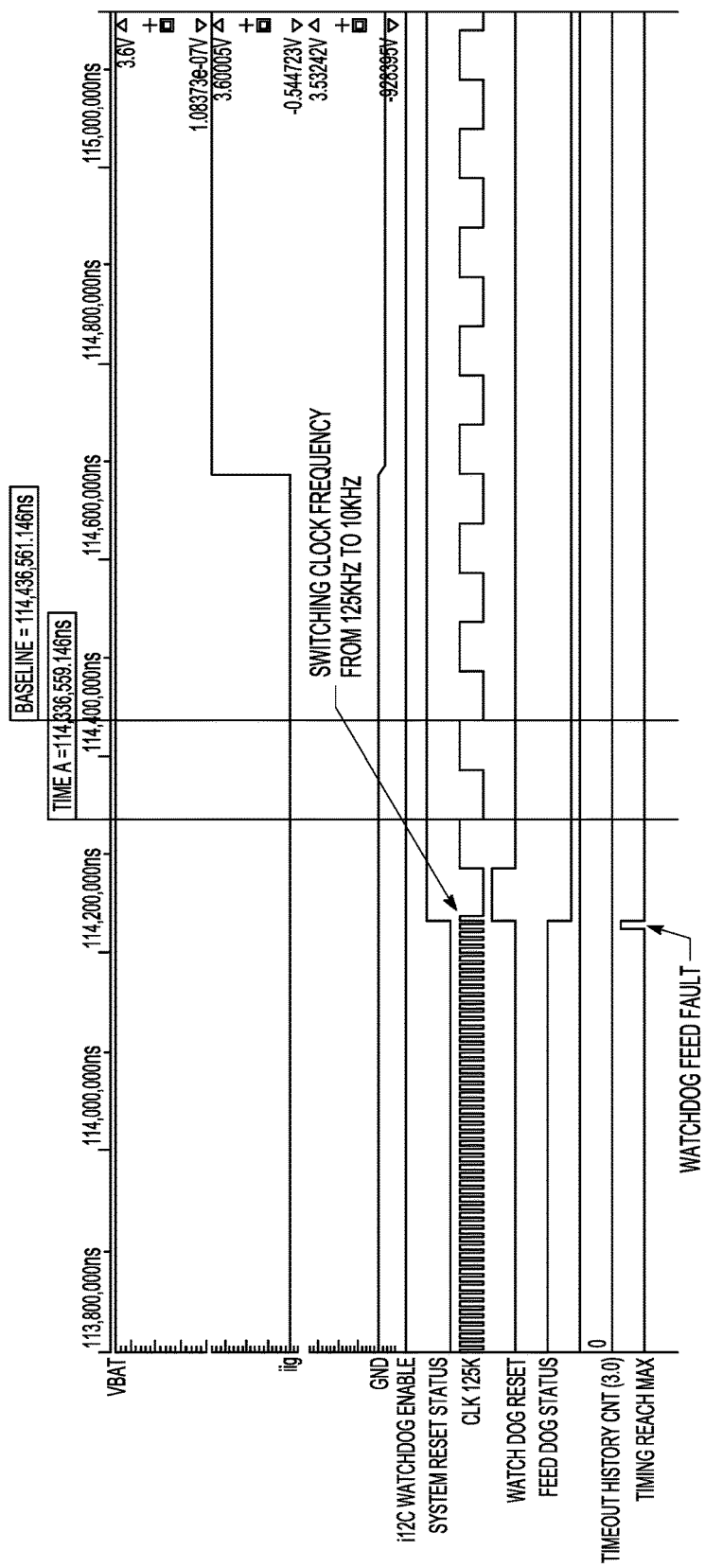

FIGS. 3A and 3B illustrate example simulation results of a specific application example of a restart apparatus according to an embodiment of the present subject matter.

As shown in FIG. 3A, when the processor does not respond, the watchdog feed status (FEED DOG STATUS) indicates an exception and the watchdog timer reaches a maximum (WD TIMING REACH MAX=1), a watchdog feed failure is indicated, and a reset operation (WATCHDOG RESET=1) is triggered; then the power-switching control pin changes its output to a high level so that power supplied by the main battery is cut off; then the power-switching control pin is restored to output a high resistance so that the power supplied by the main battery is restored, and a reset pin changes its output to a low level so as to output a reset signal to the processor; then the watchdog feed failure is recorded in the watchdog history register.

As shown in FIG. 3b, when the watchdog timer reaches the maximum (WD TIMING REACH MAX=1), a watchdog feed failure is indicated and a reset operation (WATCHDOG RESET=1) is triggered, a clock frequency of the watchdog timer (CLK 125K) switches from 125 kHz to 10 kHz, thereby reducing power consumption.

Figure 4:
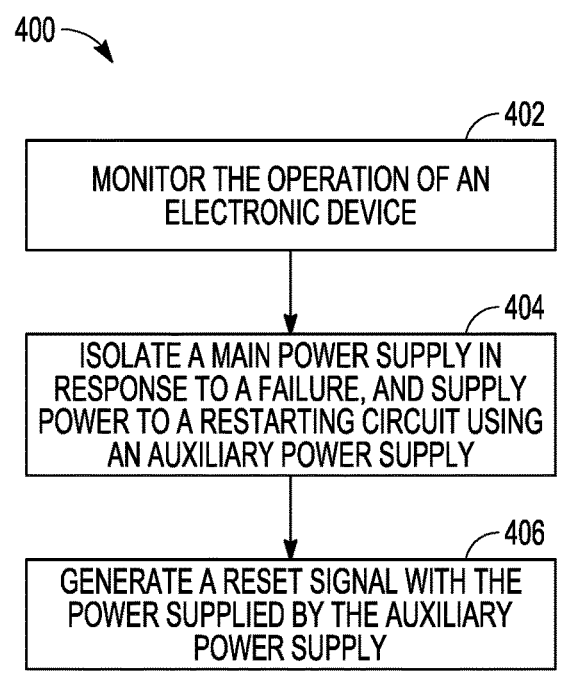
FIG. 4 illustrates an example restart method.

FIG. 4 shows a flow diagram of a restarting method 400 according to various embodiments of the present subject matter. At 402, operation of an electronic device can be monitored. At 404, a main power supply can be isolated from an auxiliary power supply in response to a failure of the electronic device so that power is supplied to a reset circuit by the auxiliary power supply (e.g., and not the main power supply). At 406, a reset signal for restarting the electronic device can be generated with the power supplied by the auxiliary power supply (e.g., and not power supplied by the main power supply).

In an example, a first signal generated by the reset circuit may be used to control a first transistor so that the main power supply is disconnected from the auxiliary one; and current that flows through a body diode of the first transistor is limited. In an example, after the main power supply is isolated from the auxiliary one, a discharging circuit may be used to release remaining charges in the electronic device. In an example, a time frequency of the reset circuit may be switched from a first clock frequency to a second one in response to a failure of the electronic device, where the first clock frequency is greater than the second one. In an example, each failure of the electronic device may be recorded.

ADDITIONAL NOTES

An example (e.g., "Example 1") of subject matter (e.g., an apparatus) may include a reset circuit configured to provide a first signal indicative of an electronic device failure; and an isolation circuit configured to isolate a main power supply from an auxiliary power supply in response to the first signal so that power is supplied to the reset circuit by the auxiliary power supply, wherein the reset circuit is configured to generate a reset signal for restarting the electronic device with the power supplied by the auxiliary power supply.

In Example 2, the subject matter of Example 1 may optionally be configured such that a first terminal of the main power supply is connected to a first voltage terminal, a second terminal of the main power supply is connected to a first ground terminal, a first terminal of the auxiliary power supply is connected to a first voltage terminal, and a second terminal of the auxiliary power supply is connected to a second ground terminal; and the isolation circuit can comprise a first transistor configured to disconnect the first ground terminal and the second ground terminal in response to a first signal from the reset circuit, and a first current limiter configured to limit current flow through the body diode of the first transistor.

In Example 3, the subject matter of any one or more of Examples 1-2 may optionally be configured such that the first current limiter comprises a resistor.

In Example 4, the subject matter of any one or more of Examples 1-3 may optionally be configured such that the isolation circuit comprises second and third transistors, connected in series with each other, and configured to disconnect a second terminal of the main power supply from the first ground terminal in response to the first signal from the reset circuit.

In Example 5, the subject matter of any one or more of Examples 1-4 may optionally be configured such that the auxiliary power supply comprises a capacitor.

In Example 6, the subject matter of any one or more of Examples 1-5 may optionally be configured to include a discharge circuit configured to release residual charges in the electronic device in response to a failure of the electronic device.

In Example 7, the subject matter of any one or more of Examples 1-6 may optionally be configured to include a clock switching circuit, configured to switch a clock frequency of the reset circuit from a first clock frequency to a second clock frequency in response to a failure of the electronic device, wherein the first clock frequency is greater than the second clock frequency.

In Example 8, the subject matter of any one or more of Examples 1-9 may optionally be configured to include a history register configured to record each failure of the electronic device.

In Example 9, the subject matter of any one or more of Examples 1-8 may optionally be configured such that the isolation circuit is configured to isolate a main power supply from an auxiliary power supply in response to the first signal so that power is supplied to the reset circuit by the auxiliary power supply, and not the main power supply.

An example (e.g., "Example 10") of subject matter (e.g., an electronic device) may include a processor, a main power supply, and a restart apparatus, the restart apparatus comprising an auxiliary power supply, a reset circuit, and an isolation circuit, wherein the reset circuit is configured to provide a first signal to the isolation circuit in response to a failure of the processor, the isolation circuit is configured to isolate the main power supply from the auxiliary power supply in response to the first signal so that power is supplied to the reset circuit by the auxiliary power supply, and the reset circuit is configured to generate a reset signal for restarting the processor with the power supplied by the auxiliary power supply.

In Example 11, the subject matter of Example 10 may optionally be configured such that a first terminal of the main power supply is connected to a first voltage terminal, a second terminal of the main power supply is connected to a first ground terminal, a first terminal of the auxiliary power supply is connected to a first voltage terminal, and a second terminal of the auxiliary power supply is connected to a second ground terminal; and the isolation circuit comprises a first transistor configured to disconnect the first ground terminal and the second ground terminal in response to a first signal from the reset circuit and a first current limiter configured to limit current flow through the body diode of the first transistor.

In Example 12, the subject matter of any one or more of Examples 10-11 may optionally be configured such that the isolation circuit comprises second and third transistors, connected in series with each other, and configured to disconnect a second terminal of the main power supply from the first ground terminal in response to the first signal from the reset circuit.

In Example 13, the subject matter of any one or more of Examples 10-12 may optionally be configured such that the auxiliary power supply comprises a capacitor.

In Example 14, the subject matter of any one or more of Examples 10-13 may optionally be configured such that the restart apparatus comprises a discharge circuit configured to release residual charges in the electronic device in response to a failure of the electronic device.

In Example 15, the subject matter of any one or more of Examples 10-14 may optionally be configured such that the restart apparatus comprises a clock switching circuit configured to switch a clock frequency of the reset circuit from a first clock frequency to a second clock frequency in response to a failure of the electronic device, wherein the first clock frequency is greater than the second clock frequency.

An example (e.g., "Example 16") of subject matter (e.g., a method) may include monitoring operation of an electronic device, isolating a main power supply of the electronic device from an auxiliary power supply of the electronic device in response to a failure of the electronic device so that power is supplied to a reset circuit by the auxiliary power supply, and generating a reset signal for restarting the electronic device with the power supplied by the auxiliary power supply.

In Example 17, the subject matter of Example 16 may optionally be configured such that isolating the main power supply from the auxiliary power supply comprises controlling a first transistor with a first signal generated by the reset circuit to disconnect the main power supply from the auxiliary power supply, and limiting current flow through the body diode of the first transistor.

In Example 18, the subject matter of any one or more of Examples 16-17 may optionally be configured to include releasing residual charges in the electronic device through a discharge circuit after isolating the main power supply from the auxiliary power supply.

In Example 19, the subject matter of any one or more of Examples 16-18 may optionally be configured to include switching a clock frequency of the reset circuit from a first clock frequency to a second clock frequency in response to a failure of the electronic device, wherein the first clock frequency is greater than the second clock frequency.

In Example 20, the subject matter of any one or more of Examples 16-19 may optionally be configured to include recording each failure of the electronic device.

An example (e.g., "Example 21") of subject matter (e.g., a system or apparatus) may optionally combine any portion or combination of any portion of any one or more of Examples 1-20 to include "means for" performing any portion of any one or more of the functions or methods of Examples 1-20, or a "machine-readable medium" (e.g., non-transitory, etc.) including instructions that, when performed by a machine, cause the machine to perform any portion of any one or more of the functions or methods of Examples 1-20.

The above descriptions are merely specific implementation manners of the present invention, the protection scope of the present invention is not limited thereto, and variations or replacements that can be easily derived by persons skilled in the art without departing from the technical scope disclosed in the present invention shall fall within the protection scope of the present invention. Therefore, the protection scope of the present invention shall be subject to the protection scope of the claims.

The above descriptions include references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. If two elements are shown in the drawings with a line connecting them, the two elements can be either be coupled, or directly coupled, unless otherwise indicated. If two elements are coupled, one or more intervening elements may be present. In contrast, in embodiments where an element is referred to as "directly coupled" to another element, there can be no intervening elements in those embodiments.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus, comprising:
   a reset circuit configured to provide a first signal indicative of an operation failure of a processor of an electronic device; and
   an isolation circuit configured to isolate a main power supply from an auxiliary power supply in response to the first signal so that power is supplied to the reset circuit by the auxiliary power supply,
   wherein the reset circuit is configured to generate a second signal for restarting the electronic device, including resetting the processor, with the power supplied by the auxiliary power supply.

2. The apparatus of claim 1, wherein a first terminal of the main power supply is connected to a first voltage terminal, a second terminal of the main power supply is connected to a first ground terminal, a first terminal of the auxiliary power supply is connected to the first voltage terminal, and a second terminal of the auxiliary power supply is connected to a second ground terminal, and
   wherein the isolation circuit comprises:
   a first transistor configured to disconnect the first ground terminal and the second ground terminal in response to the first signal from the reset circuit; and
   a current limiter configured to limit current flow through a body diode of the first transistor.

3. The apparatus of claim 2, wherein the current limiter comprises a resistor.

4. The apparatus of claim 2, wherein the isolation circuit comprises:
   second and third transistors, connected in series with each other, and configured to disconnect the second terminal of the main power supply from the first ground terminal in response to the first signal from the reset circuit.

5. The apparatus of claim 1, wherein the auxiliary power supply comprises a capacitor.

6. The apparatus of claim 1, comprising:
   a discharge circuit configured to release residual charges in the electronic device in response to the operation failure of the processor of the electronic device.

7. The apparatus of claim 1, comprising:
a clock switching circuit, configured to switch a clock frequency of the reset circuit from a first clock frequency to a second clock frequency in response to the operation failure of the processor of the electronic device,
wherein the first clock frequency is greater than the second clock frequency.

8. The apparatus of claim 1, comprising:
a history register configured to record each operation failure of the processor of the electronic device.

9. The apparatus of claim 1, wherein the isolation circuit is configured to isolate the main power supply from the auxiliary power supply, such that power is supplied to the reset circuit by the auxiliary power supply, and not the main power supply.

10. An electronic device comprising:
a processor;
a main power supply; and
a restart apparatus comprising:
an auxiliary power supply;
a reset circuit; and
an isolation circuit,
wherein the reset circuit is configured to provide a first signal to the isolation circuit in response to an operation failure of the processor,
wherein the isolation circuit is configured to isolate the main power supply from the auxiliary power supply in response to the first signal so that power is supplied to the reset circuit by the auxiliary power supply, and
wherein the reset circuit is configured to generate a second signal for restarting the electronic device, including resetting the processor with the power supplied by the auxiliary power supply.

11. The electronic device of claim 10, wherein a first terminal of the main power supply is connected to a first voltage terminal, a second terminal of the main power supply is connected to a first ground terminal, a first terminal of the auxiliary power supply is connected to the first voltage terminal, and a second terminal of the auxiliary power supply is connected to a second ground terminal, and
wherein the isolation circuit comprises:
a first transistor configured to disconnect the first ground terminal and the second ground terminal in response to the first signal from the reset circuit; and
a current limiter configured to limit current flow through a body diode of the first transistor.

12. The electronic device of claim 11, wherein the isolation circuit comprises:
second and third transistors, connected in series with each other, and configured to disconnect the second terminal of the main power supply from the first ground terminal in response to the first signal from the reset circuit.

13. The electronic device of claim 10, wherein the auxiliary power supply comprises a capacitor.

14. The electronic device of claim 10, wherein the restart apparatus comprises:
a discharge circuit configured to release residual charges in the electronic device in response to the operation failure of the processor.

15. The electronic device of claim 10, wherein the restart apparatus comprises:
a clock switching circuit configured to switch a clock frequency of the reset circuit from a first clock frequency to a second clock frequency in response to the operation failure of the processor,
wherein the first clock frequency is greater than the second clock frequency.

16. A method, comprising:
monitoring operation of an electronic device, including monitoring operation of a processor the electronic device;
isolating a main power supply of the electronic device from an auxiliary power supply of the electronic device in response to an operation failure of the processor of the electronic device, so that power is supplied to a reset circuit of the electronic device by the auxiliary power supply; and
generating a reset signal for restarting the electronic device, including resetting the processor, with the power supplied by the auxiliary power supply.

17. The method of claim 16, wherein isolating the main power supply from the auxiliary power supply comprises:
controlling a first transistor with a first signal generated by the reset circuit to disconnect the main power supply from the auxiliary power supply, the first signal being indicative of the operation failure of the processor of the electronic device; and
limiting current flow through a body diode of the first transistor.

18. The method of claim 16, comprising:
releasing residual charge in the electronic device through a discharge circuit after isolating the main power supply from the auxiliary power supply.

19. The method of claim 16, comprising:
switching a clock frequency of the reset circuit from a first clock frequency to a second clock frequency in response to the operation failure of the processor of the electronic device,
wherein the first clock frequency is greater than the second clock frequency.

20. The method of claim 16, comprising:
recording each operation failure of the processor of the electronic device.

* * * * *